Feb. 13, 1934.    R. C. COUPLAND    1,946,485
RATE MECHANISM
Filed June 7, 1932    5 Sheets-Sheet 1
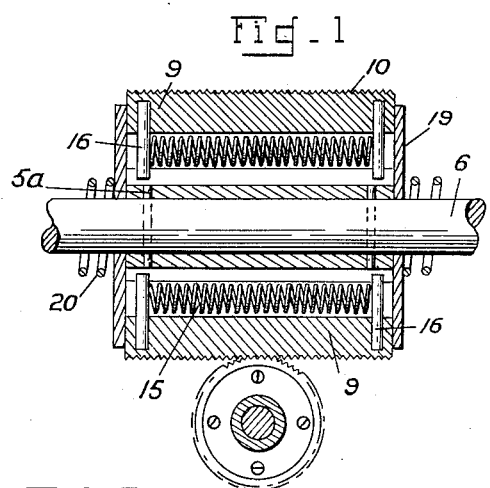
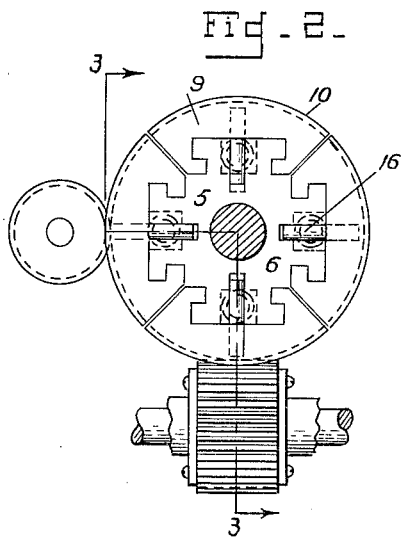
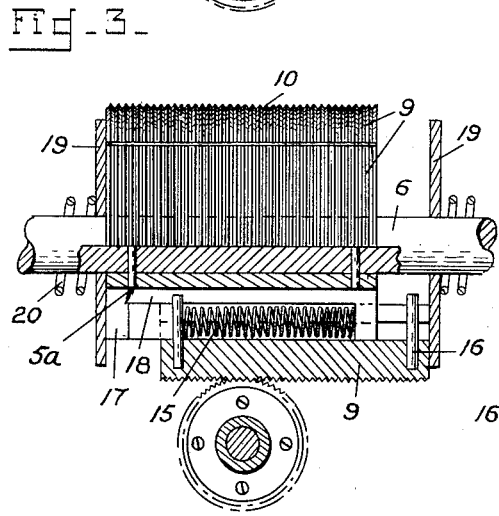
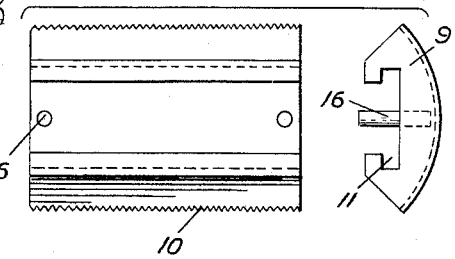
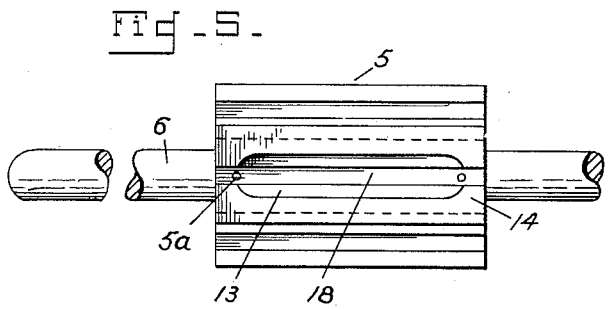
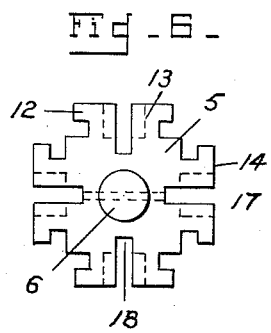
Inventor
Richard C. Coupland
W. N. Roach
Attorney

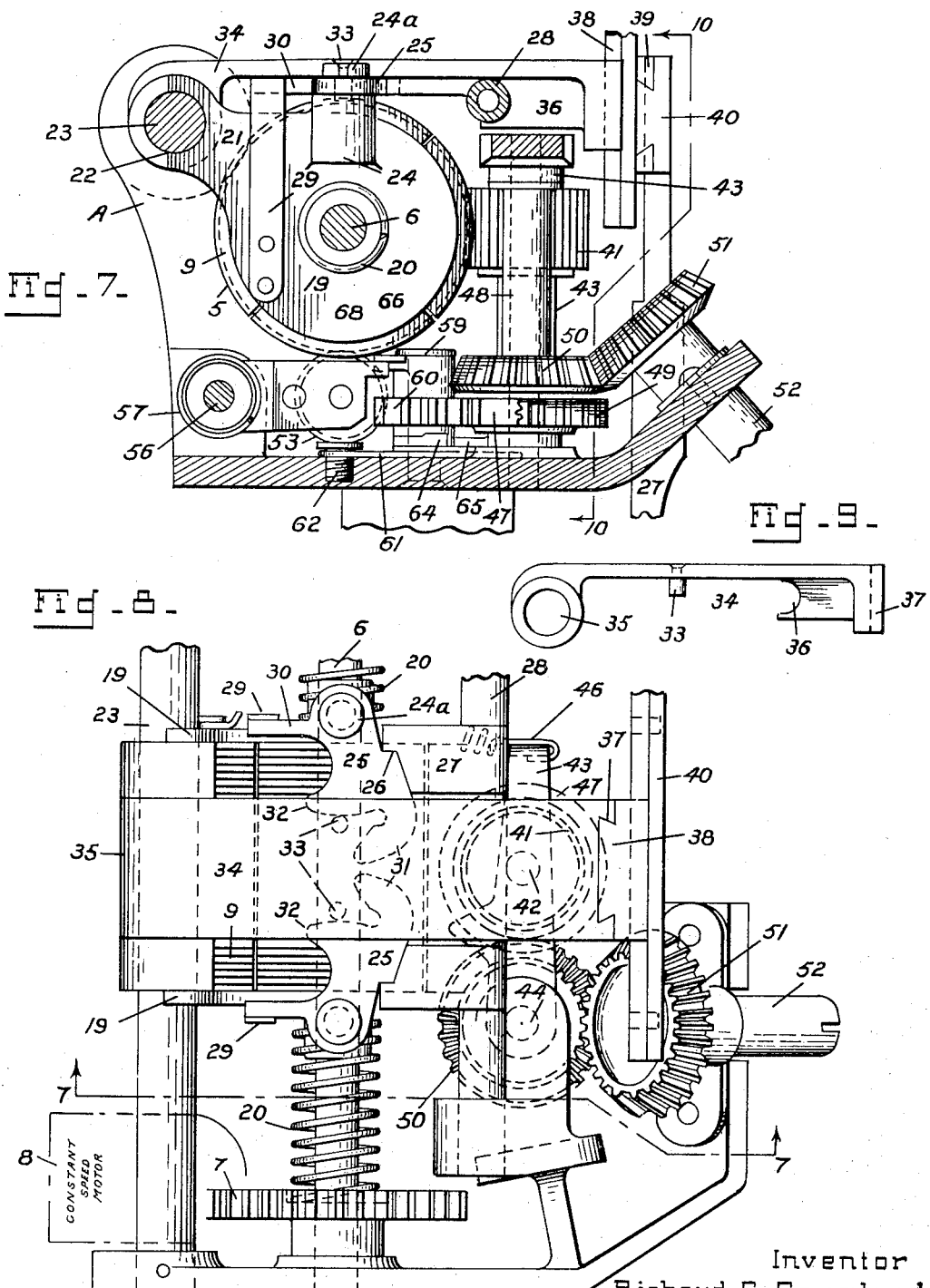

Feb. 13, 1934.    R. C. COUPLAND    1,946,485
RATE MECHANISM
Filed June 7, 1932    5 Sheets-Sheet 3
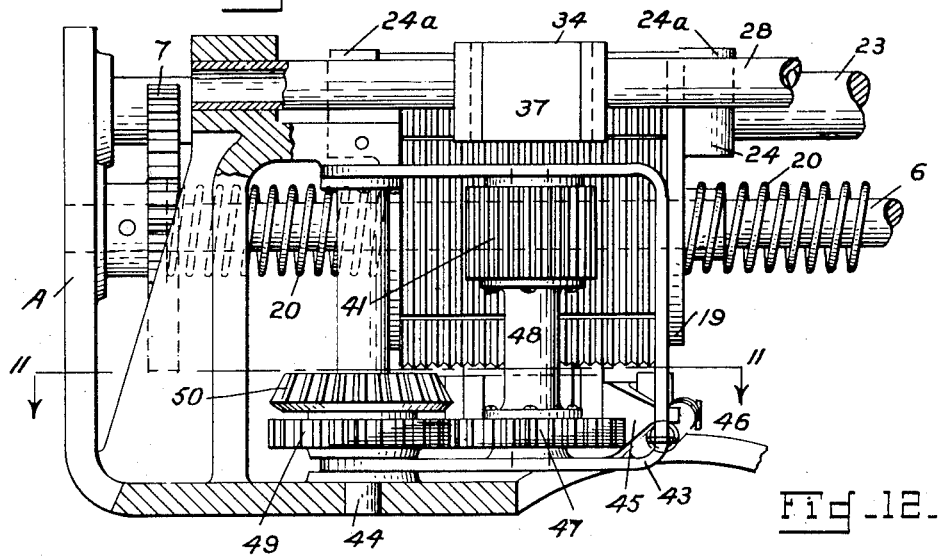
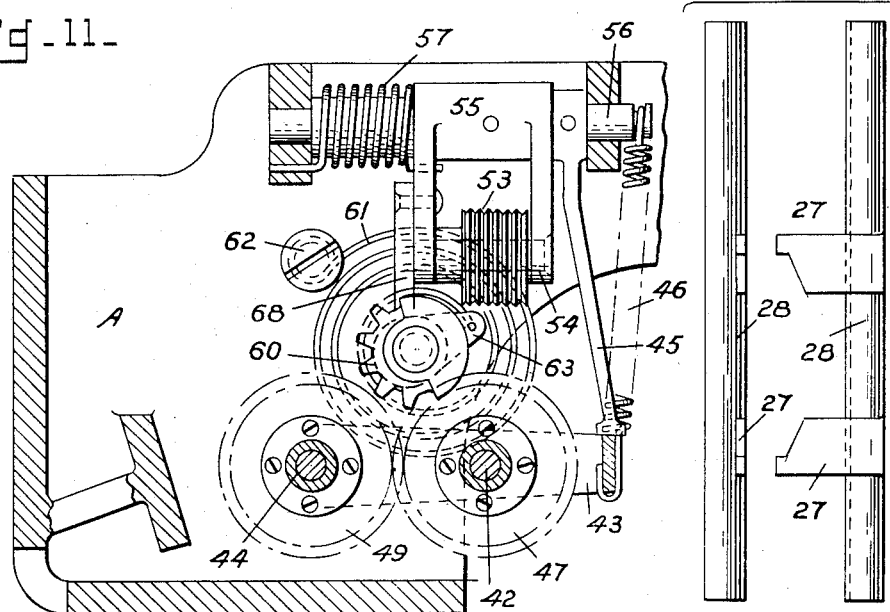
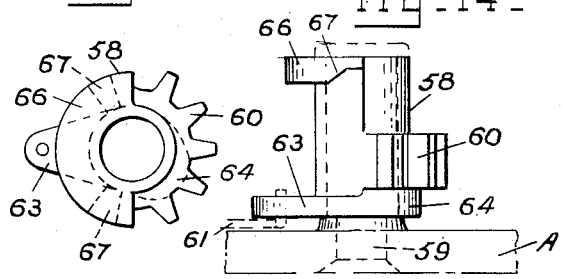
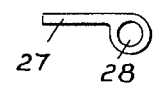
Inventor
Richard C. Coupland
W. N. Roach
Attorney

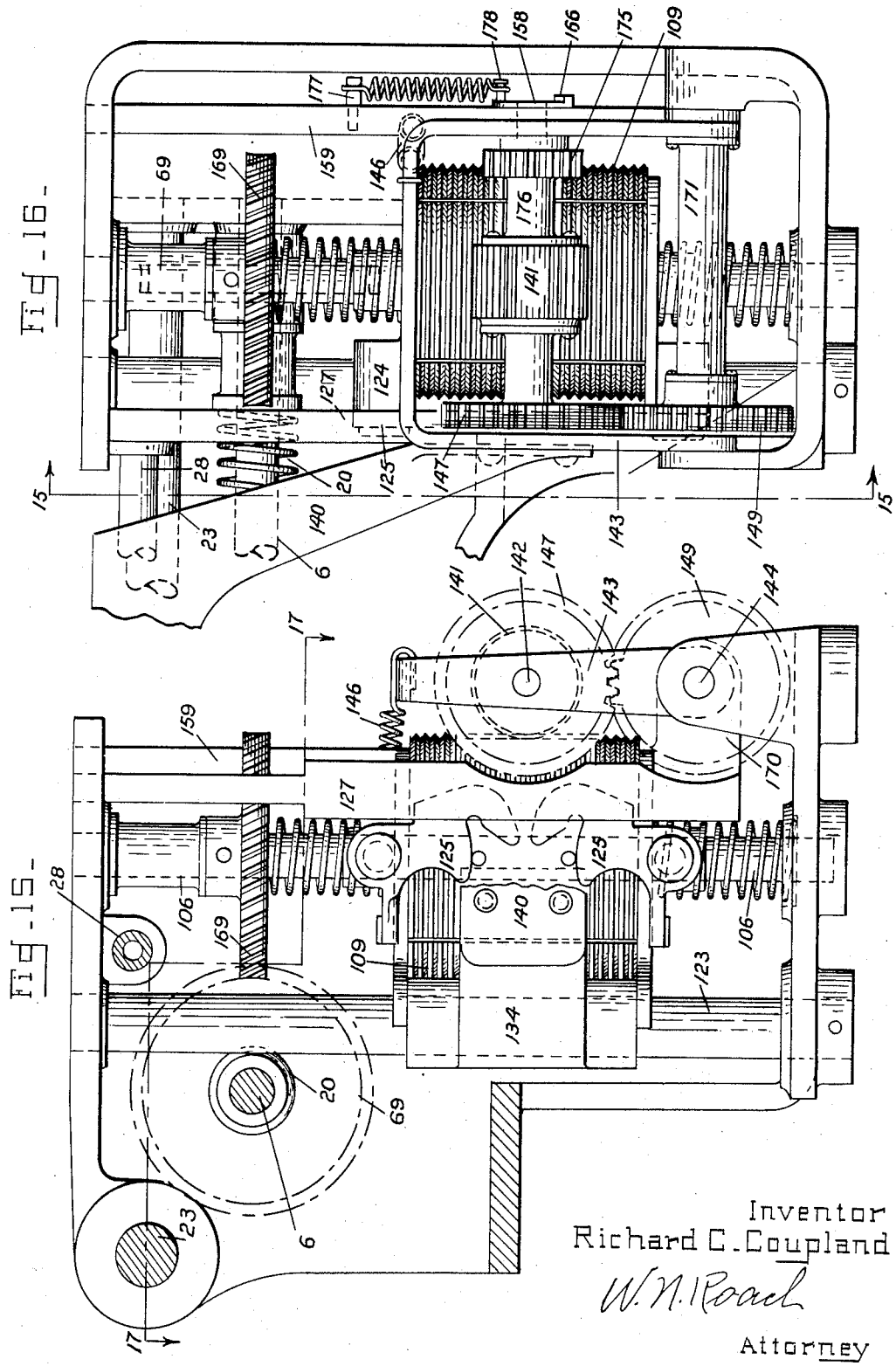

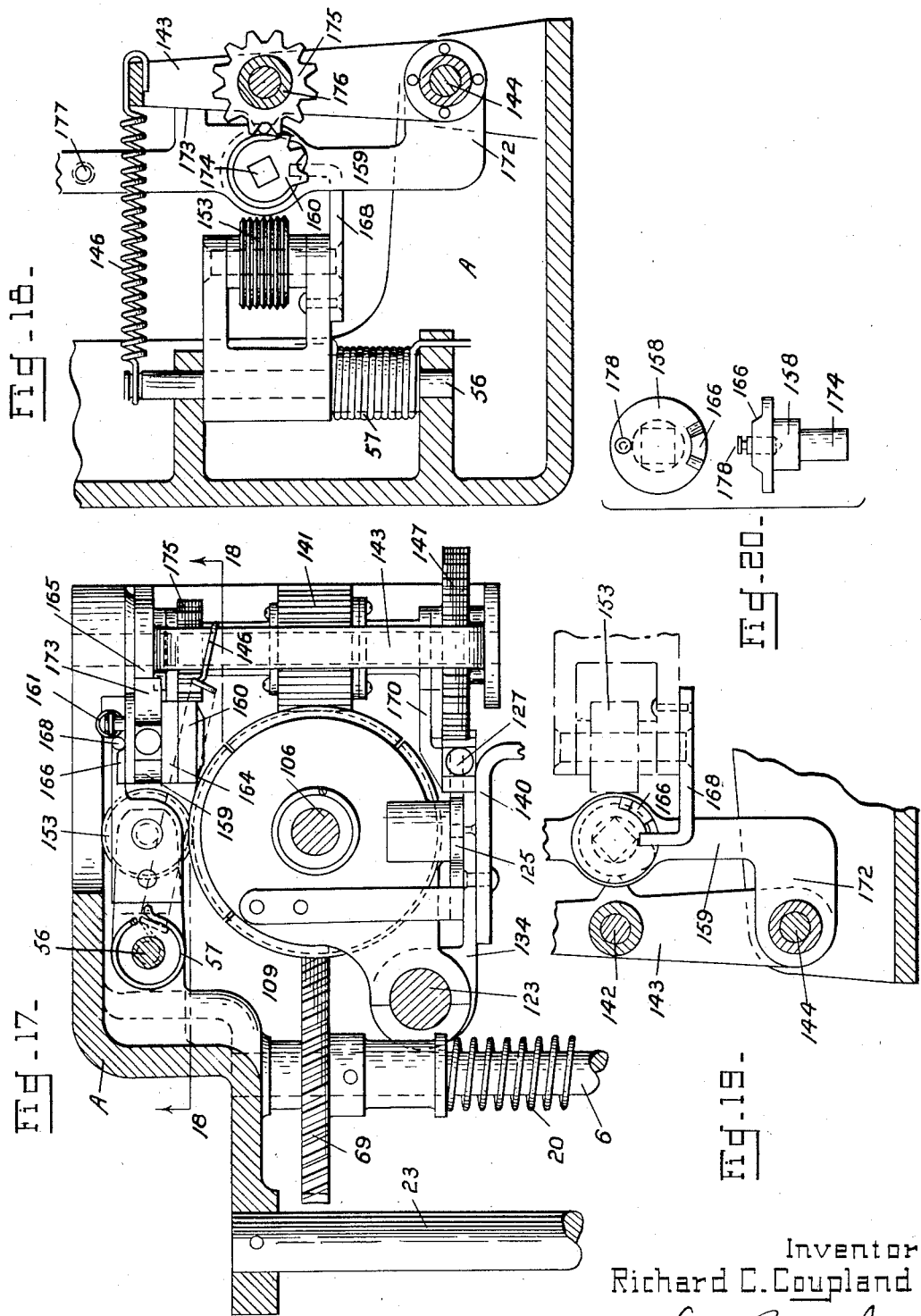

Patented Feb. 13, 1934

1,946,485

UNITED STATES PATENT OFFICE 1,946,485

RATE MECHANISM

Richard C. Coupland, United States Army, Norfolk, Va.

Application June 7, 1932. Serial No. 615,869

25 Claims. (Cl. 264—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a rate mechanism intended primarily for use in directing gun fire and is an improvement on the mechanism disclosed in copending application, Serial No. 602,364 filed March 31, 1932.

The rate mechanism consists generally in the provision of a series of slides presented successively at a constant speed to a pinion which is capable of displacing the slides axially. The displacement of the slides is continuously transmitted to a member or members whose movement is therefore proportional to the speed of the pinion during the interval that a slide is presented to the pinion.

The improvements proposed in the present invention are directed to the mounting of the slides, to means for holding the slides in displaced position and transmitting their displacement, and to means for temporarily disengaging the driving gear from the slides when the driving gear is reversed.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view of the improved rate mechanism showing the slides in the neutral position.

Fig. 2 is an end view of Fig. 1 with the pressure plate removed.

Fig. 3 is a view partly in side elevation and partly in section and showing a slide in displaced position.

Fig. 4 is detail views of a slide.

Fig. 5 is a detail view in side elevation of the drum.

Fig. 6 is an end view of Fig. 5.

Fig. 7 is a sectional view on the line 7—7 of Fig. 8.

Fig. 8 is a plan view of Fig. 7.

Fig. 9 is a detail view in side elevation of the carriage of the horizontal rate mechanism.

Fig. 10 is a view partly in rear elevation and partly in section on the line 10—10 of Fig. 7.

Fig. 11 is a sectional view on the line 11—11 of Fig. 10.

Fig. 12 shows views in detail of the guide for the hooked levers.

Figs. 13 and 14 are respectively views in top plan and side elevation of the cam members of the throw-out control.

Fig. 15 is a view in left side elevation on the line 15—15 of Fig. 16 showing the vertical rate mechanism.

Fig. 16 is a view in rear elevation of the vertical rate mechanism.

Fig. 17 is a plan view taken on the line 17—17 of Fig. 15.

Fig. 18 is a sectional view on the line 18—18 of Fig. 17 and showing the inside of the cam and segmental gear support.

Fig. 19 is a fragmentary view in elevation showing the outside of the support.

Fig. 20 is a view showing details of one of the cam members.

Referring to Figs. 1 to 6, the rate mechanism comprises a drum secured by means of pins 5a to a shaft 6 that projects beyond both ends of the drum. A gear wheel 7 (Fig. 8) on one of the projecting ends of the shaft is driven from a constant speed motor generally indicated at 8. The motor may be of any preferred constant speed type.

A plurality of similar slides 9, preferably four, having rack teeth 10 are arranged about the periphery of the drum and are mounted for longitudinal movement parallel to the axis thereof by means of a tongue and groove connection. In the preferred embodiment of the invention the groove 11, T-shaped in cross section, is formed in the slide and the complementary tongue 12 is provided on the drum.

Each tongue is formed with a longitudinal recess 13 intermediate its ends 14 for housing a helical spring 15. A pin 16 on each end of the slide is normally disposed in a slot 17 in each end 14 of the tongue and is in contact with the seated end of the spring 15. Upon longitudinal movement of a slide, one of the pins compresses the spring while the other pin passes through the slot and is completely disengaged from the spring. The spring tends to maintain the slide in neutral position. The inner end of each pin 16 is disposed in a channel 18 formed in the floor of the recess 13 and extending the entire length of the drum.

A pressure plate 19 slidably mounted on the shaft 6 at each end of the drum and as clearly shown in Fig. 3 receives the axial displacement of the slides 9. A spring 20 embracing the shaft 6 acts on the outer face of the pressure plate and restores it to neutral position.

In the illustration of the invention two rate mechanisms are combined, one being disposed in a horizontal plane and the other in a vertical plane. While the principles of operation are the same this grouping has resulted in some variations of structure. The horizontal mechanism which will be described first, is shown in Figs. 7 to 14 and is contained in a frame A.

Referring to Fig. 7 each of the identical pressure plates 19 is formed with an arm 21 terminating in a half-bearing 22 that is engageable with a supporting rod 23 parallel to the shaft 6. A bearing 24 on the outer side of the plate receives the fulcrum pin 24a of a hooked lever 25, whose normal inoperative position is at an angle to the axis of the drum 5. The back or rear edge of the lever is formed with a cam face 26 normally perpendicular to the axis of movement of the pressure plate. The cam face 26 is normally engaged with a fixed guide 27, the pair of guides for the two levers being appropriately spaced and secured to a rod 28. A flat spring 29 carried by the pressure plate acts on an arm 30 of the lever to normally maintain it against the fixed guide. The inside edges of the fingers 31 and 32 of the hooked lever constitute cams serving during rotation of the lever to displace a pin 33 secured to a carriage 34. This provision is made because during the initial movement of the pressure plate, the lever is not engaged with the pin 33 and the pin must receive a subsequently increased movement in order that its displacement will exactly correspond to the displacement of the pressure plate. The levers acting in opposite directions serve as clutches to selectively engage and release the pins 33—33 of the carriage.

The carriage 34 shown in detail in Fig. 9 has an elongated bearing 35 mounted on the supporting rod 23 between the arms 21 of the two pressure plates. The opposite end of the carriage has a half-bearing 36 engaging the rod 28 carrying the fixed guides 27. This end of the carriage is provided with a vertical groove 37 for receiving a slide 38. The slide in turn is provided with a horizontal groove 39 for receiving a carriage 40 which is moved vertically by the vertical rate mechanism to be described later.

The mechanism for displacing the slides 9 consists of a pinion 41 whose rate of movement is to be interpreted in the horizontal displacement of the carriage 34. The pinion is rotatably mounted on an axle 42 fixed in a stirrup 43. The stirrup is pivotally mounted on an axle 44 and is normally held against a stop 45, Fig. 11 by means of a spring 46. A spur gear 47 mounted on the axle 42 and secured to the pinion by a sleeve 48 meshes with a spur gear 49 mounted on the axle 44. A bevel gear 50 associated with the spur gear 49 meshes with a bevel gear 51 on the drive shaft 52.

In order that a slide 9, when displaced by the pinion 41, may be held in the position of its displacement while the pinion is acting on a succeeding slide, there is provided a roller 53 having the same character of teeth as the pinion 41. The roller however is mounted on an axle 54 parallel to the axis of the drum 5 (Fig. 7) and serves in the capacity of a pawl. The axle 53 is carried by a yoke 55 (Fig. 11) pinned on a shaft 56. A torsion spring 57 embracing the shaft 56 acts on the yoke to normally maintain the roller in engagement with one of the slides 9. The shaft 56 also serves as an anchor for the spring 46, (Fig. 11) and mounts the stop 45 which is pinned thereto and is confined between the yoke and the frame A.

The four slides 9 are each approximately 90 degrees in width and the roller 53 is accordingly spaced from the pinion 41 by an approximately corresponding amount. By virtue of this arrangement the trailing edge of a slide on the rotating drum will be disengaged from the pinion at the same time that the leading edge of the slide becomes engaged by the roller. Consequently the slide will be held in the position of its displacement while the pinion is acting on a succeeding slide.

By reference to Fig. 8 it may be seen that if the upper lever 25 on the drawings is moved by a pressure plate it moves the carriage 34 and both of the pins 33. The unengaged pin 33 will have been moved beyond the reach of the lower lever. Upon sudden reversal of the direction of rotation of the pinion 41 the lower lever would be moved downwardly before the carriage was restored to neutral position and consequently this lever could not pick up its pin 33. In order to allow for this situation and insure the neutral positioning of the carriage upon reversal of rotation of the pinion 41 a mechanism is provided for temporarily disengaging the pinion 41 and the roller 52 when the pinion is reversed.

As shown in Figs. 7, 11, 13 and 14 a cam member 58 is rotatably mounted on a pin 59 fixed in the floor of the frame A. A segmental gear 60 integral on the cam member is adapted to mesh with the spur gear 47 associated with the pinion 41. As seen in Fig. 11 when the gear 47 is rotated to the left it moves the segmental gear 60 to the position shown and thereafter holds it in this position. Upon reversal of the gear 47 it drives the segmental gear 60 to an opposite position thereby similarly rotating the cam member. A coil spring 61 anchored on a pin 62 and attached to an arm 63 on the cam member tends to normally move the segmental gear 60 into driving engagement with the spur gear.

A cam 64 directly underneath the segmental gear 60 is movable into engagement with a projection 65 on the stirrup 43 when the cam member is rotated. As seen in Fig. 11, when the gear 47 is reversed the cam 64 by striking the projection 65 will move the stirrup about its pivot 44 and thereby disengage the pinion 41 from the slides 9.

The semi-circle plate 66, on the cam member 58 (Figs. 13–14) is formed with spaced cam faces 67—67 adjacent each end and on its under side. An arm 68 secured to the yoke 55 has its extremity disposed in the path of rotation of the plate 66. In Fig. 11 the arm is underneath one end of the plate and is held in engagement therewith by the spring 57. Upon rotation of the plate 66 the adjacent cam face 67 striking the arm 68 will move the yoke about its axis and disengage the roller 53 from the slides 9.

The vertical rate mechanism shown in Figs. 15 to 20 is generally similar to the horizontal rate mechanism just described. In order to avoid repetition in the description all corresponding parts of the vertical mechanism have the same reference characters, preceded by 100, as the horizontal mechanism. Only those parts having a different structure will be described in detail.

Referring to Fig. 15 a spiral gear 69 on one end of the shaft 6 meshes with a spiral gear 169 on the shaft 106 carrying the drum and slides 109 of the vertical mechanism.

The carriage 134 is mounted on a rod 123 and is displaced by the hooked levers 125. A connecting plate 140 secured to the carriage 134 leads to and is actually a part of the carriage 40 in Figs. 7 and 8. The fixed guide 127 for the hooked levers has a foot 170 on its lower end whereby it is mounted on the sleeve 171 on the pivotal axle 144 of the stirrup 143. The upper end of the fixed guide is mounted in the frame A as clearly seen in Fig. 15.

The stirrup 143 carries the pinion 141 which is driven through the spur gears 147 and 149.

The mechanism for controlling the disengagement of the pinion 141 and the roller 153 (Fig. 18) from the slides 109 is carried by a support 159 (Fig. 18) having a foot 172 mounted on the axle 144 and having its upper end mounted in the frame A. A lug 173 on the support acts as a stop for the stirrup when the latter is moved by its spring 146.

An assembled cam member corresponding to the cam member 58 is carried by the support 159 and is based on a member 158 (Fig. 20) journaled in the support 159. The member 158 includes the cam 166 for actuating the arm 168 on the roller unit 153 and has a squared shaft 174 on which are mounted a cam plate 164 (Fig. 17) for engaging the projection 165 on the stirrup and a segmental gear 160 meshing with the spur gear 175 connected with the pinion 141 through the sleeve 176. A coil spring 161 anchored on a pin 177 on the support is attached to a pin 178 on the member 158, and normally tends to hold the segmental gear 160 in driving engagement with the spur gear 175.

The operation will be described with reference to the horizontal rate mechanism Figs. 7 to 14.

The motor 8 running at a predetermined and constant rate of speed rotates the drum 5 at a known and constant rate. If the pinion 41 is stationary the slides 9 will remain in their normal position during rotation of the drum. If the pinion is being rotated it will displace the engaged slide 9 in a direction corresponding to the direction of rotation of the pinion. This movement of the slide will be a measure of the angular movement of the pinion during the time for example one quarter of a second that the particular slide is passing in mesh with the pinion. In other words it will be proportional to the speed of the pinion and the peripheral speed of the slide. As one slide becomes disengaged from the pinion the succeeding slide in neutral position becomes engaged. In order to prevent fluttering of the carriage to which the movement of the slides is transmitted, the first slide will be held in its most advanced position by the roller 53 and it will not be released until a preceding slide has been engaged by the pinion, by virtue of the revolution of the drum 5. When a slide has passed from engagement with both the pinion and the roller acting as a pawl it is immediately restored to neutral position through the action of the slide spring 15 while the pressure plate 19 and carriage 34 are restored by one of the springs 20.

When the direction of rotation of the pinion 41 is reversed the gear 47 of the driving gear train rotates the segmental gear 60 and with it the cams 64 and 67. The cam 64 strikes the stirrup 43 and the cam 67 strikes the arm 68 on the yoke 55 and as a result the pinion carried by the stirrup and the roller carried by the yoke are temporarily disengaged from the slides 9. This interval is sufficient to permit the hooked lever 25 and the carriage engaged thereby to be restored to neutral position.

I claim.

1. In a rate mechanism, a rotatable shaft, a drum fast on said shaft, a plurality of tongues, T-shaped in cross-section, formed on the drum, each of said tongues having a recess intermediate its ends and a channel in the floor of the recess and extending the entire length of the drum, a plurality of grooved slides, each fitting on one of the tongues of the drum, a pin on each end of a slide riding in the channel of the drum, a coil spring disposed in the recess of the drum with its ends engaged by the pins of the slide, a member at each end of the drum receiving the movements of the slides, and a pinion for displacing the slides.

2. A rate mechanism including a drum driven at a constant speed, slides mounted on the periphery of the drum for movement longitudinally thereof, means for normally holding the slides in neutral position, a pivotally mounted support adjacent the slides, a pinion carried by said support and meshing with the slides, a gear movable with the pinion, a spring acting on the support and normally holding the pinion in mesh with the slides, a second pivotally mounted support, a pawl carried by said support and meshing with the slides, a spring acting on the second support and normally holding the pawl in mesh with the slides, a member between the supports having cams engageable with the supports whereby the latter are moved to disengage the pinion and pawl from the slides, and a segmental gear on said member driven by the gear associated with the pinion.

3. A rate mechanism including a drum driven at a constant speed, slides mounted on the periphery of the drum for movement longitudinally thereof, means for normally holding the slides in neutral position, a pivotally mounted support adjacent the slides, a pinion carried by said support and meshing with the slides, a spring acting on the support and normally holding the pinion in mesh with the slides, a second pivotally mounted support, a pawl carried by said support and meshing with the slides, a spring acting on the second support and normally holding the pawl in mesh with the slides, and means operable by reversal of the pinion for temporarily moving the supports to disengage the pinion and pawl from the slides.

4. A rate mechanism including a rotatable drum, slides mounted on the periphery of the drum for movement longitudinally thereof, means for normally holding the slides in neutral position, a pinion for displacing the slides, a pivotal mounting for the pinion, a pawl for temporarily holding the slides in displaced position, a pivotal mounting for the pawl, a member having cams engageable with the pivotal mountings whereby the latter are moved to disengage the pinion and pawl from the slides, and means including a segmental gear on the cam member operable by reversal of the pinion for rocking said cam member.

5. A rate mechanism including a rotatable drum, slides mounted on the periphery of the drum for movement longitudinally thereof, means for normally holding the slides in neutral position, a pinion for displacing the slides, a pivotal mounting for the pinion, a pawl for temporarily holding the slides in displaced position, a pivotal mounting for the pawl, a member having cams engageable with the pivotal mountings whereby the latter are moved to disengage the pinion and pawl from the slides, and means operable by reversal of the pinion for rocking said cam member.

6. A rate mechanism including a rotatable drum, slides mounted on the periphery of the drum for movement longitudinally thereof, means for normally holding the slides in neutral position, a pinion for displacing the slides, a pawl for temporarily holding the slides in displaced position, and means operable for reversal of the pinion for disengaging the pawl from the slides.

7. A rate mechanism including a rotatable drum, slides mounted on the periphery of the drum for movement longitudinally thereof, means for normally holding the slides in neutral position, a pinion for displacing the slides, and means operable on reversal of the pinion for disengaging the pinion from the slides.

8. A rate mechanism including a frame, a rotatable drum carried by the frame, slides mounted on the periphery of the drum for movement longitudinally thereof, a pivotally mounted pinion for displacing the slides, a pivotally mounted pawl for temporarily holding a slide in displaced position, and a cam member carried by the frame and operable upon reversal of the pinion for disengaging the pinion and pawl from the slides.

9. A rate mechanism including a frame, a rotatable drum carried by the frame, slides mounted on the periphery of the drum for movement longitudinally thereof, a pivotally mounted pinion for displacing the slides, and a cam member carried by the frame and operable upon reversal of the pinion for disengaging the pinion from the slides.

10. A rate mechanism including a rotatable drum, slides mounted on the periphery of the drum for movement longitudinally thereof, a yoke having an axis parallel to the drum, a pawl carried by the yoke and engageable with the slides, a stirrup having an axis perpendicular to the drum, a pinion carried by the stirrup and engageable with the slides, a spring anchored on the axis of the yoke and attached to the stirrup for holding the pinion in engagement with the slides, and a stop member carried by the axis of the yoke for limiting movement of the stirrup under influence of the spring.

11. A rate mechanism including a rotatable drum, slides mounted on the periphery of the drum for movement longitudinally thereof, a yoke having an axis parallel to the drum, a pawl carried by the yoke and engageable with the slides, a stirrup having an axis perpendicular to the drum, a pinion carried by the stirrup and engageable with the slides, a spring anchored on the axis of the yoke and attached to the stirrup for holding the pinion in engagement with the slides, and a stop member for limiting movement of the stirrup under influence of the spring.

12. A rate mechanism including a rotatable drum, slides mounted on the periphery of the drum for movement longitudinally thereof, a yoke having an axis parallel to the drum, a pawl carried by the yoke and engageable with the slides, a stirrup having an axis perpendicular to the drum, a pinion carried by the stirrup and engageable with the slides, a spring attached to the stirrup for holding the pinion in engagement with the slides, and a stop member carried by the axis of the yoke for limiting movement of the stirrup under influence of the spring.

13. A rate mechanism including a rotatable drum, slides mounted on the periphery of the drum for movement longitudinally thereof, a stirrup having an axis perpendicular to the drum, a pinion carried by the stirrup for displacing the slides, a support mounted on the axis of the stirrup, a cam member carried by the support and operable upon reversal of the pinion for moving the stirrup away from the drum, a spring for returning the stirrup into position with the pinion engaging the slides, and means on the support for limiting movement of the stirrup under the influence of the spring.

14. A rate mechanism including a rotatable drum, slides mounted on the periphery of the drum for movement longitudinally thereof, a stirrup having an axis perpendicular to the drum, a pinion carried by the stirrup for displacing the slides, a support mounted on the axis of the stirrup, and a cam member carried by the support and operable upon reversal of the pinion for moving the stirrup away from the drum.

15. A rate mechanism including a frame, a rotatable drum carried by the frame, slides mounted on the periphery of the drum for movement longitudinally thereof, an axle mounted in the frame perpendicular to the axis of the drum, a stirrup pivotally mounted on the axle, a sleeve spacing the extremities of the stirrup, a gear wheel on said sleeve, an axle mounted in the stirrup, a pinion on said axle for displacing the slides, and a gear wheel fixed on the pinion and meshing with the gear wheel on the spacing sleeve.

16. A variable speed transmission mechanism including a frame, a rotatable drum carried by the frame, slides mounted on the periphery of the drum for movement longitudinally thereof, means for normally holding the slides in neutral position, a pinion for displacing the slides, a plate at each end of the drum overlying the ends of the slides, a spring normally tending to hold each plate against the drum, a hooked lever on each plate, a carriage having two pins, each engageable by one lever, a fixed guide for each lever constraining the lever to rotate into engagement with one of the pins on the carriage when the lever is displaced by movement of the slides, and a spring for each lever normally tending to hold the lever out of engagement with the pin on the carriage and against the fixed guide.

17. A variable speed transmission mechanism including a rotatable drum, slides mounted on the periphery of the drum for movement longitudinally thereof, means for normally holding the slides in neutral position, a pinion for displacing the slides, a plate at each end of the drum overlying the ends of the slides, means normally tending to hold each plate against the drum, a carriage mounted for movement parallel to the slides, a clutch on each plate and operable on movement thereof to engage the carriage, and means for normally holding each clutch out of engagement with the carriage.

18. A variable speed transmission mechanism including a rotatable drum, slides mounted on the periphery of the drum for movement longitudinally thereof, means for normally holding the slides in neutral position, a pinion for displacing the slides, a plate at each end of the drum overlying the ends of the slides, means normally tending to hold each plate against the drum, a carriage mounted for movement parallel to the slides, and means on each plate and operable on movement thereof for selectively engaging the carriage.

19. In combination with, a reciprocal driving member and a driven member mounted for movement parallel to the driving member, a pair of spaced pins on the driven member, a plate at each end of the driving member and movable thereby, a spring for normally holding said plate in the neutral position of the driving member, a lever mounted on each of the plates, each lever having a hook with opposite cam faces for engaging one of the pins of the driven member, a fixed guide for each lever constraining the lever to rotate into engagement with one of the pins of the driven member when the lever is displaced by movement of the plate, and a spring for each lever normally tending to hold the lever out of engagement with the pin on the carriage and against the fixed guide.

20. In a driving mechanism, a frame, a rotatable drum carried by the frame, slides mounted on the periphery of the drum for movement longitudinally thereof, a plate at each end of the drum receiving the movement of the slides, a guide rod on the frame engageable by said plates, a carriage mounted on the guide rod, and means for transmitting the movement of the plates to the carriage.

21. A transmission mechanism embodying opposed slidable plates, means for retaining the plates in and returning them to normal position, a hooked lever on each plate, a carriage having two pins, each engageable by its respective lever, a fixed guide for each lever constraining the lever to rotate into engagement with one of the pins on the carriage when the lever is displaced by movement of its plate, and a spring normally tending to hold each lever out of engagement with its respective pin on the carriage and against the fixed guide.

22. A transmission mechanism embodying opposed slidable plates, a carriage mounted for movement parallel to the movement of the plates, a coupling element on each plate and operable on movement thereof to engage a complemental element on the carriage, and means for holding each coupling element out of engagement with its complemental element.

23. A transmission mechanism embodying opposed slidable plates, a carriage mounted for movement parallel to the movement of the plates, and means on each plate and operable on movement thereof for selectively engaging the carriage.

24. A transmission mechanism embodying opposed slidable plates, a driven member mounted for movement parallel to the movement of the plates, a pair of spaced pins on the driven member, means for holding said plates in and returning them to normal position, a lever mounted on each of the plates, each lever having a hook with opposite cam faces for engaging one of the pins of the driven member, a fixed guide for each lever constraining the lever to rotate into engagement with one of the pins of the driven member when the lever is displaced by movement of the plate, and a spring for each lever normally tending to hold the lever out of engagement with the pin on the driven member and against the fixed guide.

25. A transmission mechanism embodying a frame, guide rods mounted in the frame, a member to be driven mounted on the guide rods, opposed plates slidable on the guide rods and positioned on opposite sides of said member, means for holding said plates in and returning them to normal position, and means for transmitting the movement of said plates to the driven member.

RICHARD C. COUPLAND.